United States Patent
Kitamura

(10) Patent No.: US 7,339,638 B2
(45) Date of Patent: Mar. 4, 2008

(54) MICRO-LENS SUBSTRATE, LIQUID CRYSTAL DISPLAY ELEMENT HAVING SAME, AND PROJECTION-TYPE LIQUID CRYSTAL DISPLAY DEVICE

(75) Inventor: Kazuya Kitamura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 247 days.

(21) Appl. No.: 10/545,247

(22) PCT Filed: Jan. 29, 2004

(86) PCT No.: PCT/JP2004/000878

§ 371 (c)(1),
(2), (4) Date: Aug. 9, 2005

(87) PCT Pub. No.: WO2004/070462

PCT Pub. Date: Aug. 19, 2004

(65) Prior Publication Data

US 2006/0077319 A1    Apr. 13, 2006

(30) Foreign Application Priority Data

Feb. 10, 2003    (JP) .............................. 2003-032871

(51) Int. Cl.
 *G02F 1/1335* (2006.01)
 *G02F 1/133* (2006.01)
 *G02B 27/10* (2006.01)

(52) U.S. Cl. .............................. 349/95; 349/5; 353/32; 359/621

(58) Field of Classification Search .................... 349/5, 349/95; 353/32; 359/621
See application file for complete search history.

(56) References Cited

U.S. PATENT DOCUMENTS

| | | | |
|---|---|---|---|
| 5,299,289 A | * | 3/1994 | Omae et al. ................. 349/201 |
| 5,555,476 A | * | 9/1996 | Suzuki et al. .................. 349/95 |
| 5,633,737 A | | 5/1997 | Tanaka et al. |
| 5,764,319 A | | 6/1998 | Nishihara |
| 5,764,323 A | | 6/1998 | Fukuda |
| 6,144,426 A | | 11/2000 | Yamazaki et al. |

(Continued)

FOREIGN PATENT DOCUMENTS

EP    0 758 100 A2    2/1997

(Continued)

*Primary Examiner*—Toan Ton
*Assistant Examiner*—John Heyman
(74) *Attorney, Agent, or Firm*—David G. Conlin; Peter J. Manus; Edwards Angell Palmer & Dodge LLP

(57) ABSTRACT

A liquid crystal panel unit (2) includes, on its side from which light enters, a micro-lens substrate (1) having: a first micro-lens array including a first lens (5) for converging, for converging, on aperture sections (17R•17G•17B) of respective picture elements in a liquid crystal display element, the plurality of the light beams whose respective incident angles are different from one another; and a second micro-lens array having a second lens (7) for collimating principal rays of the respective light beams. The second lens (7) is substantially trapezoid so that the lens includes slanted surfaces (7b•7b) directing its convex parts towards the light incident side. With this configuration, it is possible to realize a single-panel mode color-filterless projection-type liquid crystal display device with high light-using efficiency at a low cost, without deteriorating the light-using efficiency.

8 Claims, 13 Drawing Sheets

U.S. PATENT DOCUMENTS

| | | |
|---|---|---|
| 2002/0045028 A1 | 4/2002 | Teshima et al. |
| 2002/0080323 A1 | 6/2002 | Muroya |
| 2002/0126390 A1 | 9/2002 | Matsushita et al. |
| 2004/0100700 A1* | 5/2004 | Kitamura et al. ........... 359/622 |
| 2005/0157396 A1 | 7/2005 | Teshima et al. |

FOREIGN PATENT DOCUMENTS

| | | |
|---|---|---|
| EP | 0 953 865 | 11/1999 |
| JP | 07-181487 | 7/1995 |
| JP | 09-005725 | 1/1997 |
| JP | 09-043588 | 2/1997 |
| JP | 09-050081 | 2/1997 |
| JP | 09-090310 | 4/1997 |
| JP | 09-090336 | 4/1997 |
| JP | 10-254129 | 9/1998 |
| JP | 2000-047137 | 2/2000 |
| JP | 2000-162408 | 6/2000 |
| JP | 2000-193928 | 7/2000 |
| JP | 2000-249807 | 9/2000 |
| JP | 2000/314876 | 11/2000 |
| JP | 2001-066584 | 3/2001 |
| JP | 2001-305653 | 11/2001 |
| JP | 2002-174852 | 6/2002 |
| JP | 2002-283362 | 10/2002 |
| JP | 2002-286910 | 10/2002 |

* cited by examiner

LIGHT BEAM ENTERING DIRECTION

FIG. 7 (a)
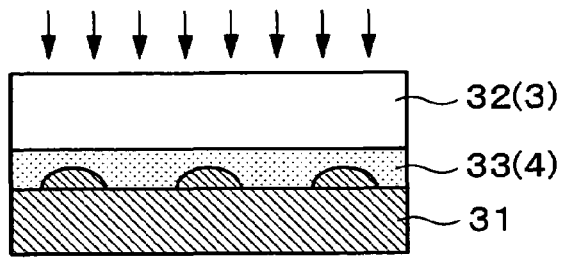
FIG. 7 (e)
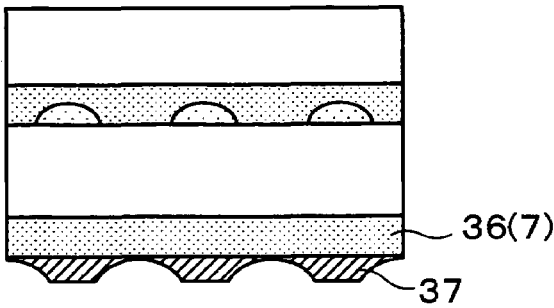
FIG. 7 (b)
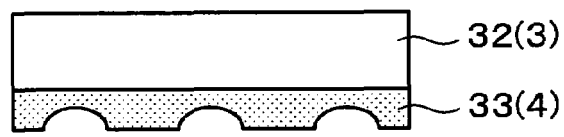
FIG. 7 (f)
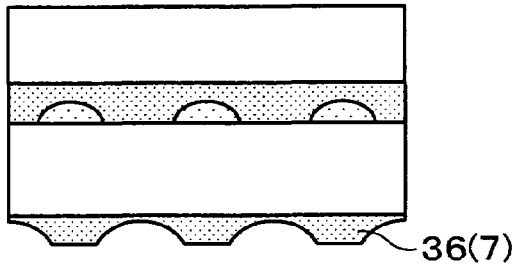
FIG. 7 (c)
FIG. 7 (g)
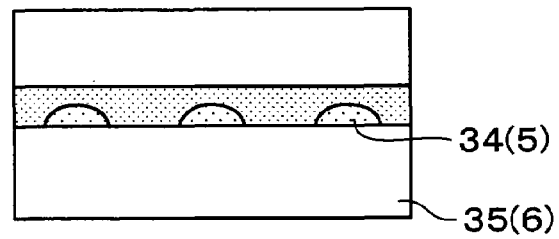
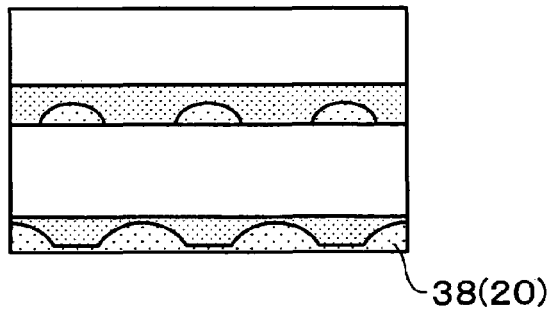
FIG. 7 (d)
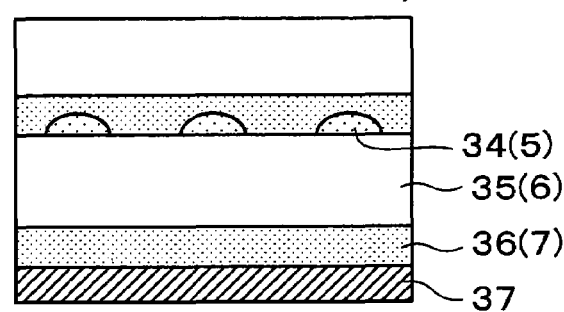

MICRO-LENS SUBSTRATE, LIQUID CRYSTAL DISPLAY ELEMENT HAVING SAME, AND PROJECTION-TYPE LIQUID CRYSTAL DISPLAY DEVICE

TECHNICAL FIELD

The present invention relates to a color-filterless projection-type liquid crystal display device of a single-panel mode, the projection-type liquid crystal display device having a liquid crystal display element being provided, on its light-incident-side, with two layers of micro-lens arrays. More specifically, the present invention relates to such a projection-type liquid crystal display device, and also relates to the liquid crystal display element and a micro-lens substrate, each of which being mounted in the projection-type liquid crystal display device.

BACKGROUND ART

A projection type liquid crystal display device has features that are more advantageous than those of a projection type CRT (cathode-ray tube) display device. For example, a color reproduction range of the liquid crystal display device is wider than that of the CRT display device. Further, a small size and a light weight of the liquid crystal display device makes it easier to carry the liquid crystal display device. Moreover, since the liquid crystal display device is not affected by earth magnetism, a convergence adjustment is not necessary. Since, it is also easy to realize a large-size screen, the liquid crystal display device is expected to be a mainstream of home-use image display device.

Among color projection type image display modes utilizing liquid crystal display element, there is three-panel mode in which three panels of liquid crystal display element are respectively used for three primary colors, and a single-panel mode in which only one panel of liquid crystal display element is used. In the three-panel mode, an optical system and three panels of liquid crystal display element are independently provided. The optical system divides a white beam into three primary colors, R, G and B, and the respective color beams are controlled by the three panels of liquid crystal display element, so as to form an image. Thus, full color display is achieved by optically superimposing images of the respective colors.

Some of the advantages of the three-panel mode are that light being emitted from a white beam source is efficiently utilized, and that the color purity is high. However, it is difficult to reduce the cost and size of a liquid crystal display device of the three-panel mode, as it requires the color separation function and the image formation function, which consequently increases the number of components thus complicating the optical system of the liquid crystal display device.

On the other hand, the single-panel mode utilizes only one panel of liquid crystal display element with a color filter pattern shaped in mosaic, stripe, or the like for three primary colors. Images are displayed by projecting light on the liquid crystal display element, using an optical system for projection. The single-panel mode is suitable for low-cost and small projection systems, because it requires only one panel of liquid crystal display element, and the structure of its optical system is simpler than one in the three-panel mode.

However, a disadvantage of the single-panel mode is that it can use only a ⅓ of incident light due to absorption or reflection of light that occurs at its color filter. In order to solve this problem, a color-filterless device, in which two layers of micro-lens arrays are provided on a light-source facing side of the liquid crystal display element has been introduced.

In such a device, dichroic mirrors are arranged in a sector form. These dichroic mirrors divide white beam from a white beam source into R, G and B, and cause the divided beams to enter the first micro-lens array at different angles. After passing the first micro-lens array, the light beams of the respective colors are refracted by a second micro-lens array so that the principal rays of the respective colors R, G and B separated by the dichroic mirrors become substantially parallel to one another. The respective light beams refracted by the second micro-lens array separately fall on liquid crystal regions driven by signal electrodes that are independently impressed with color signals corresponding with R, G and B (e.g. see Japanese Unexamined Patent Application No. 181487/1995 (Tokukaihei 7-181487; published on Jul. 21, 1995)).

The device does not use an absorbing color filter; therefore, not only the efficiency of using light improves but also the principal rays of respective colors after passing the micro-lens arrays are made substantially parallel to one another. As a result, it is possible to provide remarkably bright images by restraining diffusion of the principal rays of the respective colors before they reach a projection lens, and by preventing decrease in light quantity caused by vignetting.

Nevertheless, the foregoing color-filterless projection type liquid crystal display device of the single-panel mode, in which the efficiency of using light is improved, causes a relatively higher cost amongst the devices of the single-panel mode.

This is attributed to difficulties in manufacturing the second micro-lens array, which is one of two micro-lens arrays, for causing the principal rays of plural light beams to be parallel to each other. Amongst the plurality of beams incident to a lens of the second micro-lens array, a light beam incident to an edge portion of a lens of the second micro-lens array is deflected by the second micro-lens array so as to be parallel to the principal ray of a light beam incident to a center of the lens. This requires the lens (the second micro-lens) to have a large refraction power.

Conventionally, the second micro-lens array has lenses having a spherical surface or a cylindrical surface. The lens having the spherical surface, and the lens having the cylindrical surface both requires more thickness in order to obtain the large refraction power. This causes manufacturing of the lens to be extremely difficult, and causes an increase in the cost.

Further, a trapezoidal lens is sometimes adopted for the second micro-lens array (e.g., see Japanese Unexamined Patent Application 50081/1997 (Tokukaihei 9-50081; Published on Feb. 18, 1997)). It is easy to increase a thickness of the trapezoidal lens, for increasing the refraction power thereof. However, due to a converged light beam incident to a slanted surface of the trapezoidal lens, a refractive angle at inside of the light beam and that at outside of the light beam differ from each other. This causes a coma aberration and an astigmatism. The occurrence of these aberrations are not preferable, because they deteriorate the efficiency of using light.

The present invention was made in view of the foregoing problems, and it is an object of the present invention to realize a single-panel mode color-filterless projection type liquid crystal display device with high light-using efficiency at a low cost, without deterioration in light-using efficiency.

DISCLOSURE OF INVENTION

In order to achieve the foregoing object, a micro-lens substrate of the present invention is a micro-lens substrate provided on a side, of a liquid crystal display element, from which light enters, the liquid crystal display element being for use in a projection-type liquid crystal display device, the micro-lens substrate including: (a) a first micro-lens array for converging, on a picture element of the liquid crystal element, a plurality of light beams whose incident angles are different from one another; and (b) a second micro-lens array for collimating principal rays of the respective light beams, wherein: the second micro-lens array has a lens of substantially trapezoid so that: the lens includes (I) a center portion perpendicular to a principal ray of the light beam incident on the center portion and (II) side portions each having a slanted surface which is slanted at a predetermined angle with respect to a principal ray of an incident light beam and directs its convex part towards the light incident side, the incident light beam being incident on each of the side portions.

The second micro-lens array is the one for collimating respective principal rays of the plurality of the light beams whose respective incident angles are different from one another. This requires a large refraction power for the second micro-lens array. The foregoing second micro-lens array is configured to have substantially trapezoidal lenses such that the center portion of each of the lenses are substantially perpendicular including a manufacturing error to the principal ray of the light beam incident on the center portion; and the side portions of each of the lenses respectively have a slanted surface which is slanted at the predetermined angle with respect to the principal ray of the incident light beam.

With the lens in a shape of trapezoid, it is easier to increase the refraction power by increasing the thicknesses of the lens, as compared with a spherical or cylindrical lens. Such an arrangement makes it easier to manufacture the second micro-lens array, thus making it easier to manufacture the micro-lens substrate than an arrangement having a spherical or cylindrical lens.

If the shape of the lens is mere a trapezoid, the refractive angles of the incident light beam with respect to a plane slanted surface becomes different between an inner-side and an outer-side of the light beam. This is because the light beam is a converged light beam. This causes a coma aberration and astigmatism, which consequently deteriorates the light-using efficiency. In view of the foregoing problem, the shape of the lens is not mere a trapezoid, but such a shape that each of the slanted surfaces of the trapezoid directs their convex parts toward the incident light.

Accordingly, it is possible to (I) restrain the difference between the refractive angles of the inner-side and the outer-side of the light beam (converged light beam) incident on the slanted surface, and (II) effectively restrain the coma aberration and astigmatism. This keeps a high light-using efficiency, despite of a shape that allows an easy manufacturing process.

As a result, with a provision of the foregoing micro-lens substrate on the light-incident side of the liquid crystal display element, it is possible to realize a single-panel mode color-filterless projection-type liquid crystal display device with high light-using efficiency at a low cost, without deteriorating the light-using efficiency.

Further, in the second micro-lens array, the convex slanted surface may be spherical. This allows a highly accurate aberration-correction, thus improving the light-using efficiency.

Further, in the second micro-lens array, the convex slanted surface may be cylindrical. Since the surfaces are curved only in one direction, the manufacturing process becomes easy.

Further, in the second micro-lens array, the convex slanted surface may be aspherical. This allows more highly accurate aberration-correction, thus further improving the light-using efficiency.

Further, in the second micro-lens array, the arched slanted surface may be in a polyhedral shape having a plurality of surfaces. In this case, it is possible to make working process easier than the case of the spherical or the cylindrical surface.

In order to achieve the foregoing object, a liquid crystal display element of the present invention, for use in a projection-type liquid crystal display device includes the foregoing micro-lens substrate.

As already mentioned, the foregoing micro-lens substrate allows an easy manufacturing of the second micro-lens array, and effectively restrains effects from aberrations. As a result, by using a liquid crystal display element provided with such a micro-lens substrate, it is possible to realize a single-panel mode color-filterless projection-type liquid crystal display device with high light-using efficiency at a low cost, without deteriorating the light-using efficiency.

Further, in order to achieve the foregoing object, a projection-type liquid crystal display device of the present invention includes the foregoing liquid crystal display element for use in a liquid crystal display device.

As already mentioned, the foregoing micro-lens substrate allows an easy manufacturing of the second micro-lens array, and effectively restrains effects from the aberrations. As a result, a single-panel mode projection type-liquid crystal display device of the present invention including a liquid crystal display element having the foregoing micro-lens substrate, allows for its production at a low cost without deterioration in its light-using efficiency.

Further, in order to achieve the foregoing object, a projection-type liquid crystal display device of the present invention is a projection-type liquid crystal display device having: A) a white beam source; B) a light beam dividing section for dividing a white beam emitted from the white beam source into a plurality of light beams whose respective wavelength bands are different from one another; C) a liquid crystal display element to which the plurality of the light beams obtained from the light beam dividing section are incident, the light beams whose respective incident angles are different from one another; D) two-layers of micro-lens arrays, provided on a light-source side of the liquid crystal display element, including a) a first micro-lens array for converging, on a picture element of the liquid crystal element, the plurality of the light beams whose respective incident angles are different from one another, and b) a second micro-lens array for collimating principal rays of the respective light beams; and E) a projecting section for projecting the plurality of the light beams being modulated by the liquid crystal display element, wherein: a lens of the second micro-lens array is substantially trapezoid; and the second micro-lens array has a lens of substantially trapezoid so that: the lens includes (I) a center portion perpendicular to a principal ray of the light beam incident on the center portion and (II) side portions each having a slanted surface which is slanted at a predetermined angle with respect to a principal ray of an incident light beam and directs its convex part towards the light incident side, the incident light beam being incident on each of the side portions.

As already mentioned, the second micro-lens array is configured to have substantially trapezoidal lens such that the center portion of the lens is perpendicular to the principal ray of the light beam incident to the center portion; and the side portions of each of the lenses respectively have a slanted surface which is slanted at the predetermined angle with respect to the principal ray of the incident light beam. Further, the side portions are directing its convex part towards the light incident side. This configuration allows an easy manufacturing of the second micro-lens array, and effectively restrains a coma aberration and an astigmatism.

Accordingly, with the projection type-liquid crystal display device of the present invention including a liquid crystal display element having the foregoing two-layered micro-lens substrate, it is possible to realize a high light-using efficiency at a low cost, without deteriorating the light-using efficiency.

Additional objects, features, and strengths of the present invention will be made clear by the description below. Further, the advantages of the present invention will be evident from the following explanation in reference to the drawings.

BRIEF DESCRIPTION OF DRAWINGS

FIGS. 7(a) to 7(g) are cross sectional views illustrating a method for manufacturing the micro-lens substrate provided in the liquid crystal panel unit.

BEST MODE FOR CARRYING OUT THE INVENTION

The following examples and comparative examples provide more detailed description of the present invention. However, the present invention is not at all limited to these.

Embodiment 1

The following describes an embodiment of the present invention, with reference to FIGS. 1 to 8.

Figure 1:
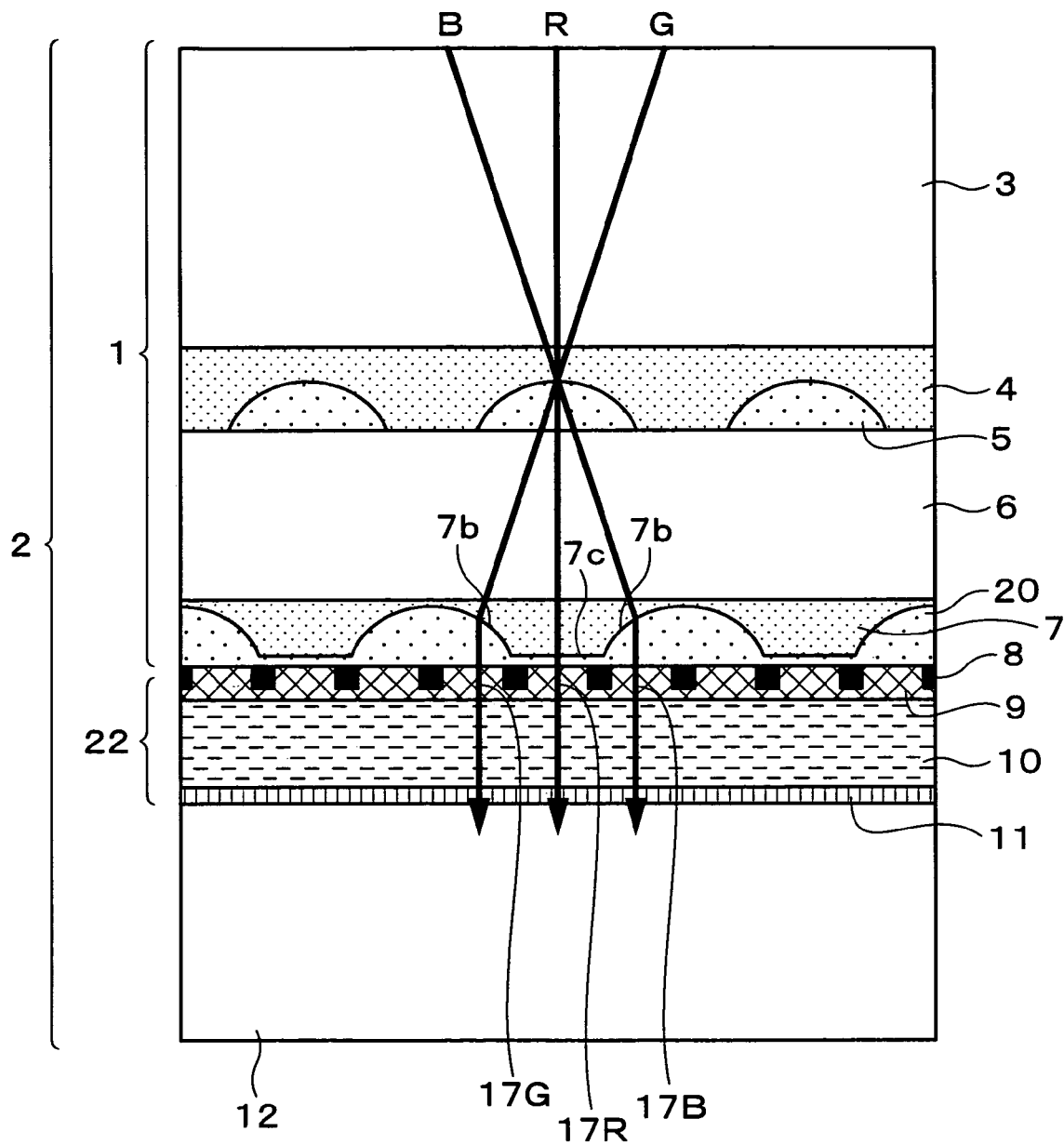
FIG. 1 illustrates an embodiment of the present invention, and is a cross sectional view illustrating a liquid crystal panel unit provided in a projection-type liquid crystal display device.
Figure 2:
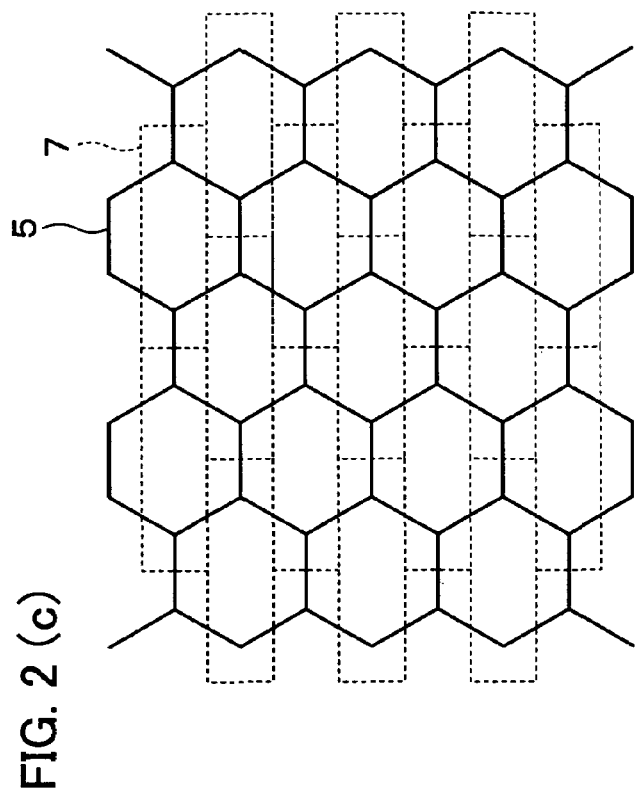
FIG. 2(a) is a plane view illustrating a first micro-lens array in a micro-lens substrate provided in the liquid crystal panel unit.
FIG. 2(b) is a plane view illustrating a second micro-lens array.
FIG. 2(c) is a schematic view illustrating a positional relationship between the first and the second micro-lens arrays.
FIG. 2(d) is a schematic view illustrating a relationship between picture elements and second lenses constituting the second micro-lens array.
Figure 2:
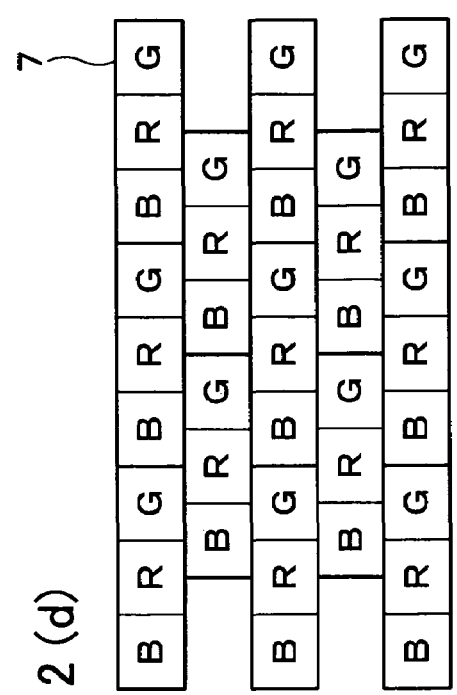
Figure 2:
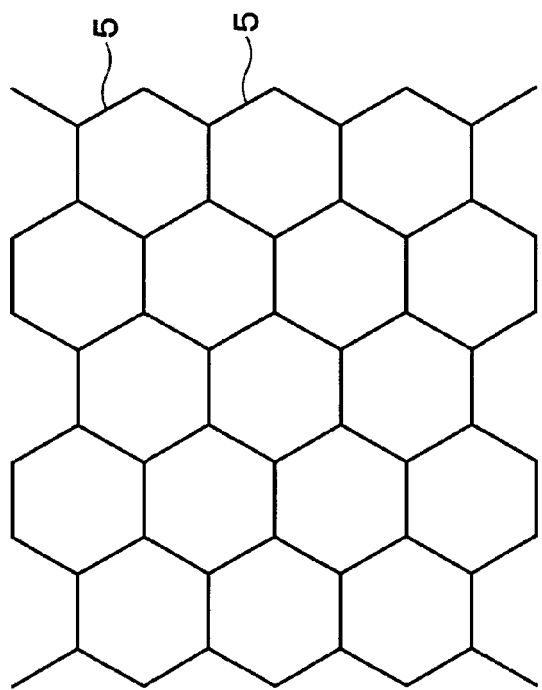
Figure 2:
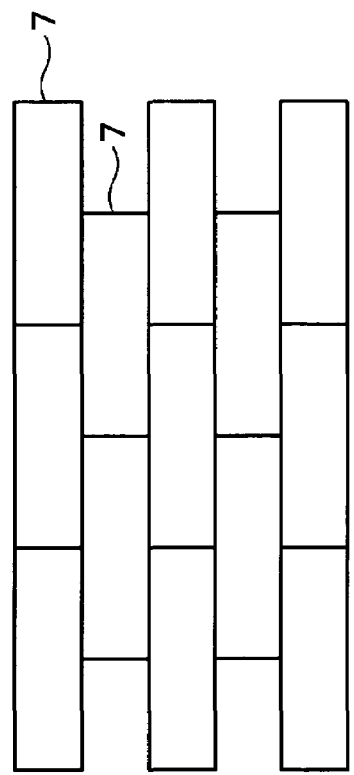

As shown in FIG. 1, a projection type liquid crystal display device of the present embodiment is provided with a liquid crystal panel unit (liquid crystal display element) 2. The liquid crystal panel unit 2 includes a plurality of first lenses (first micro lenses) 5 made of a high-refractive resin formed below on the bottom side of a light-transmissive protection plate 3 via a planarizing layer 4. The planarizing layer 4 is made of a low-refractive resin. Each of the first lenses 5 configuring the first micro-lens array is an aspherical lens, having a surface directing its convex part toward the incident light.

To a bottom of the first micro-lens array, a light-transmissive intermediate substrate 6 is attached, and second lenses (second micro lenses) 7 made of a high-refractive resin are formed below the intermediate substrate 6. Each of the second lenses 7 configuring a second micro-lens array is substantially trapezoid, and the second lens 7 includes bottom surfaces 7a on which light is incident. Each convex-concave surface of the second micro-lens array is planarized by a planarizing layer 20 made of a low-refractive resin. A black matrix layer 8 is formed under the planarizing layer 20. The series of units from the protection plate 3 to the black matrix layer 8 is hereinafter referred to as a micro-lens substrate 1.

A transparent electrode 9 made of an ITO (Indium Tin Oxide) or the like is formed under the black matrix layer 8. Further, an electrode layer 11 and a light-transmissive bottom substrate 12 are provided, and a liquid crystal layer 10 is interposed between the black matrix layer 8 and the electrode layer 11 having a TFT (Thin Film Transistor) or the like. With the transparent electrode 9, the liquid crystal layer 10, and the electrode layer 11, a pixel section 22 is configured. The black matrix layer 8 includes aperture sections 17 (17R, 17G, and 17B) corresponding with respective picture elements of R, G, and B in the pixel section 22.

The following describes further detail of the micro-lens substrate 1. As shown in FIG. 2(a), the first lenses 5 are formed in a shape of equilateral hexagon, and are densely arranged (aligned), so as to efficiently transmit light from a later-described white light source 13 (see FIG. 4). Here, for example, the first lenses 5 have a vertical pitch of 30 μm, a horizontal pitch of 45 μm, and a curvature radius of 15 μmR. The first lenses 5 are so designed that respective focal points of the first lenses 5 are positioned nearby the black matrix layer 8.

Figure 3:
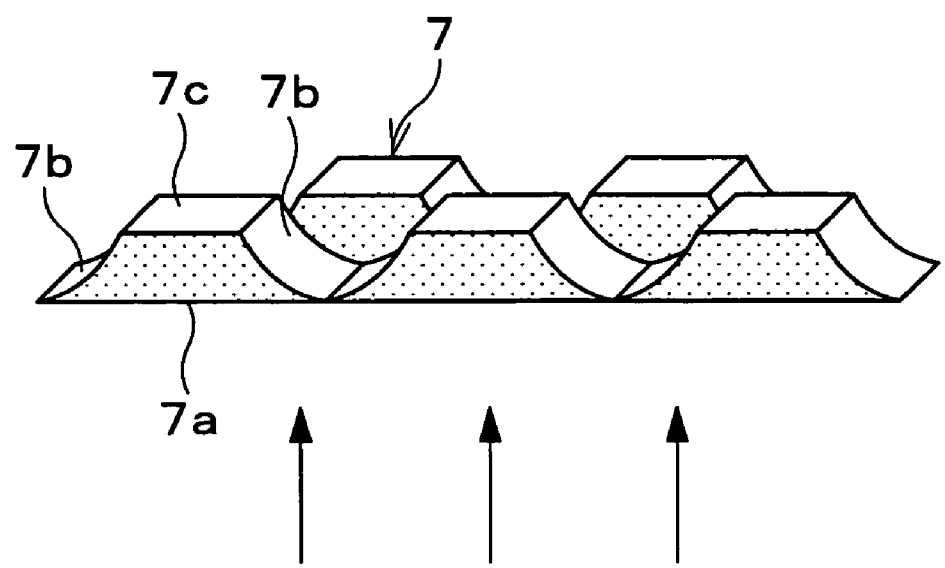
FIG. 3 is a perspective view illustrating second lenses constituting the second micro-lens array.

On the other hand, as shown in FIG. 2(b) and FIG. 3, each of the substantially trapezoidal second lenses 7 has a top surface 7c whose lengthwise side is shorter than that of the bottom surface 7a. These second lenses 7 are arranged in a bricklaying manner. The reason why the second lens 7 is substantially trapezoids is that slanted surfaces 7b of the trapezoid are curved surfaces directing their convex parts toward the incident light. For example, the second lens 7 has the following dimension. The bottom surface 7a of the second lens 7 has a dimension of Width 15 μm×Length 45 μm. The top surface 7c of the second lens 7 has a dimension of Length 15 μm×Width 15 μm. And the height of the second lens 7 is 20 μm. Further, the slanted surfaces 7b of the second lens 7 are cylindrical.

Further, as shown in FIG. 2(c), the first and the second lenses are arranged such that (I) the first lenses 5 respectively correspond with the second lenses 7 in a one-to-one manner, and (II) central axes of the first lenses respectively match with those of the second lenses.

As illustrated in FIG. 2(d), the second lenses 7 and the picture elements of R, G, and B are arranged such that each picture element R is sandwiched between its adjacent picture elements B and G in the second lenses 7. In other words, as illustrated in FIG. 1, the top surface 7c of the second lens 7 faces an aperture 17R corresponding to the picture element R, and the slanted surfaces 7b respectively face apertures 17B and 17G respectively corresponding to the picture elements B and G.

Figure 4:
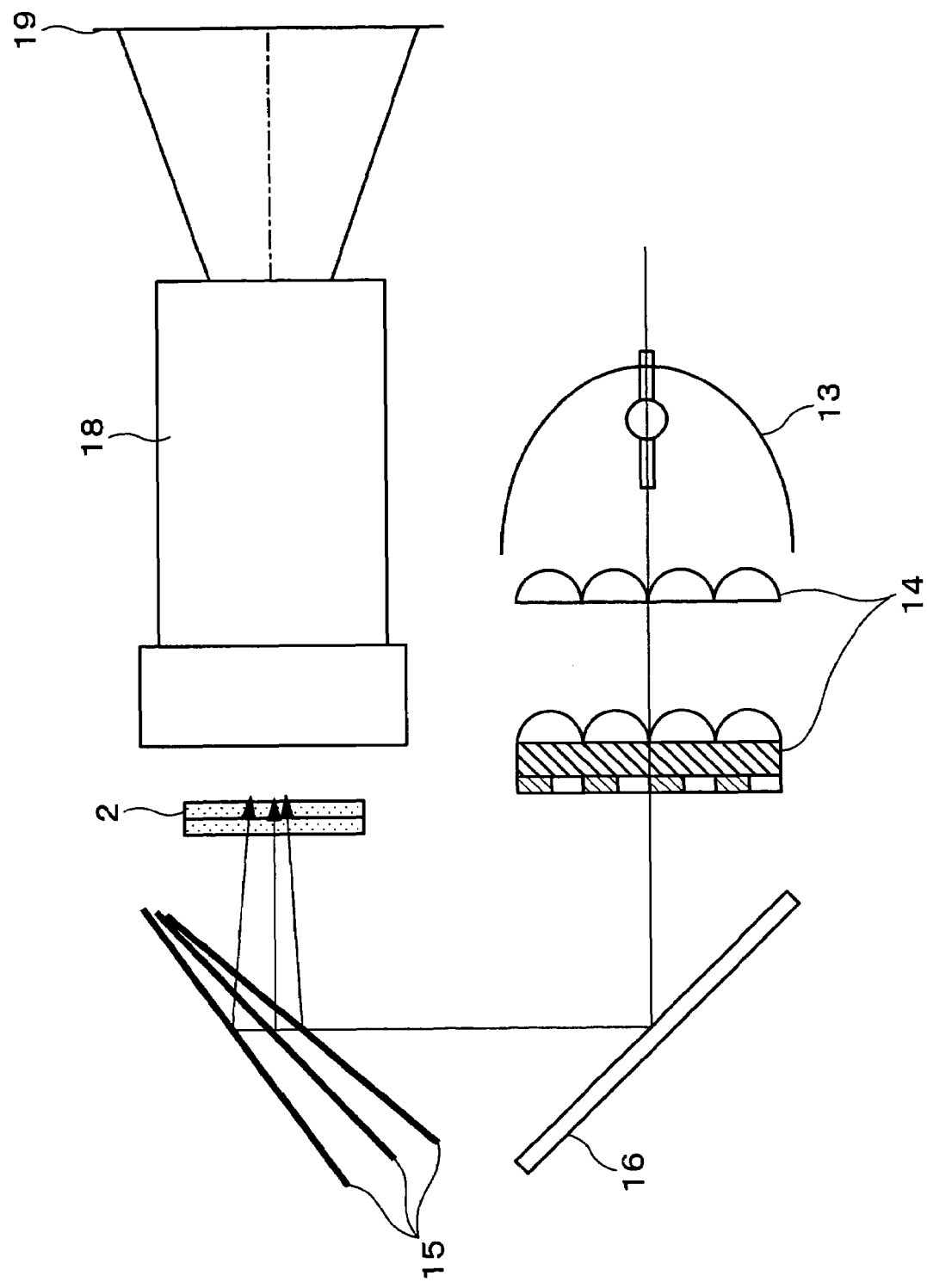
FIG. 4 is a schematic view illustrating a configuration of the projection-type liquid crystal display device.
Figure 5:
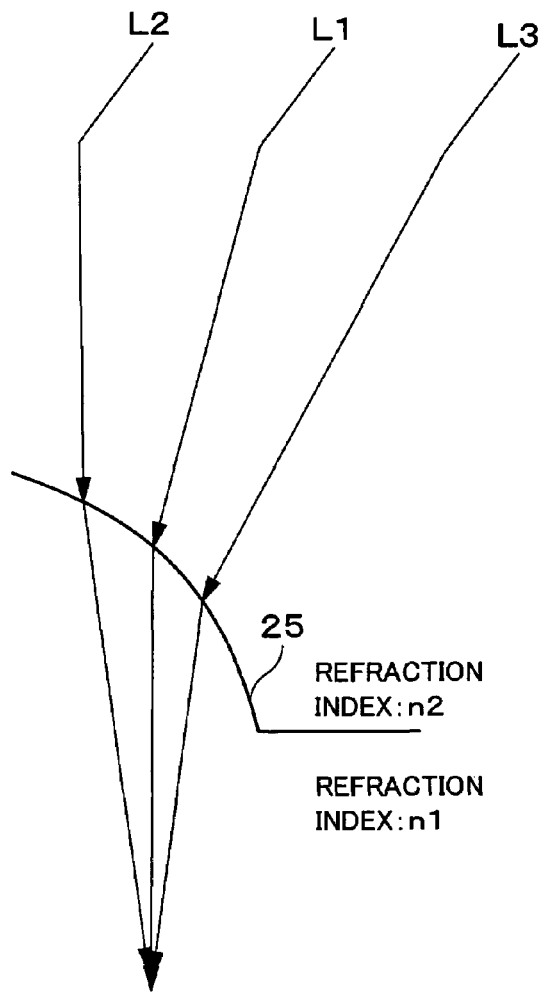
FIG. 5(a) is an explanatory diagram illustrating how a light beam travels through a curved slanted surfaces of the second lens constituting the second micro-lens array.
FIG. 5(b) is an explanatory diagram illustrating how a light beam travels through a plane slanted surfaces of the second lens constituting the second micro-lens array.
Figure 5:
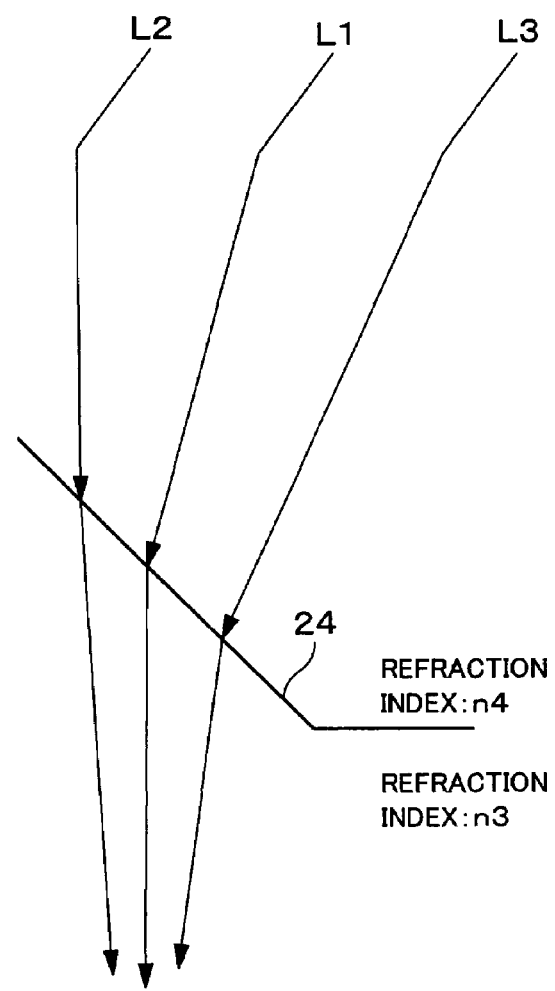
Figure 6:
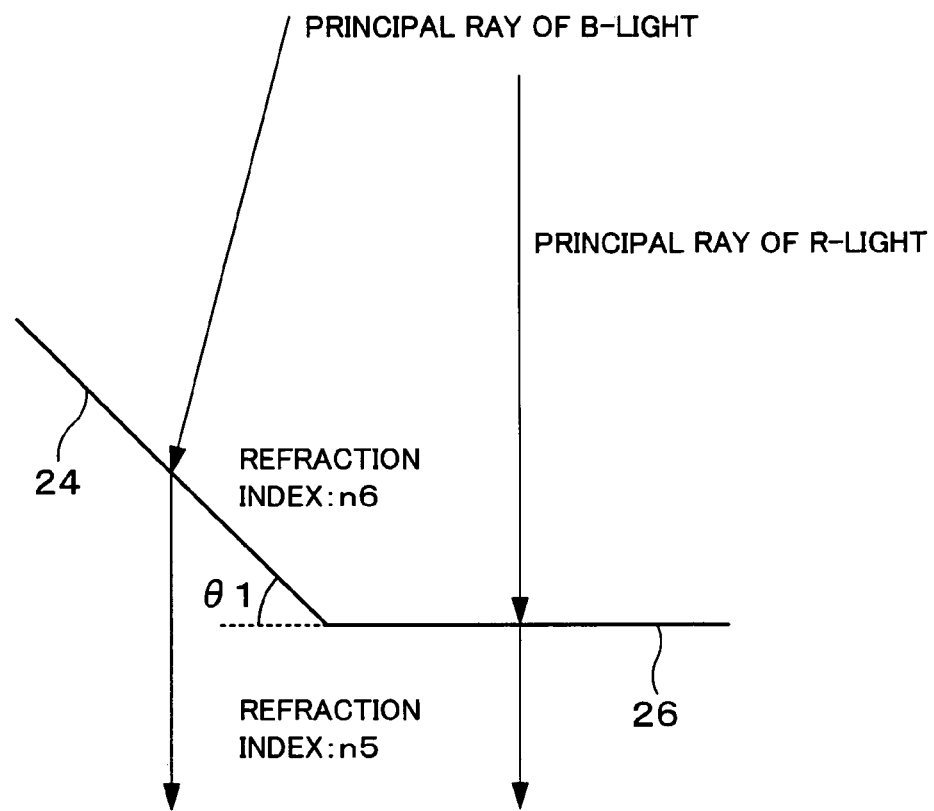
FIG. 6(a) and FIG. 6(b) are explanatory diagrams illustrating how the curved slanted surfaces of the second lens constituting the second micro-lens array are designed.
Figure 6:
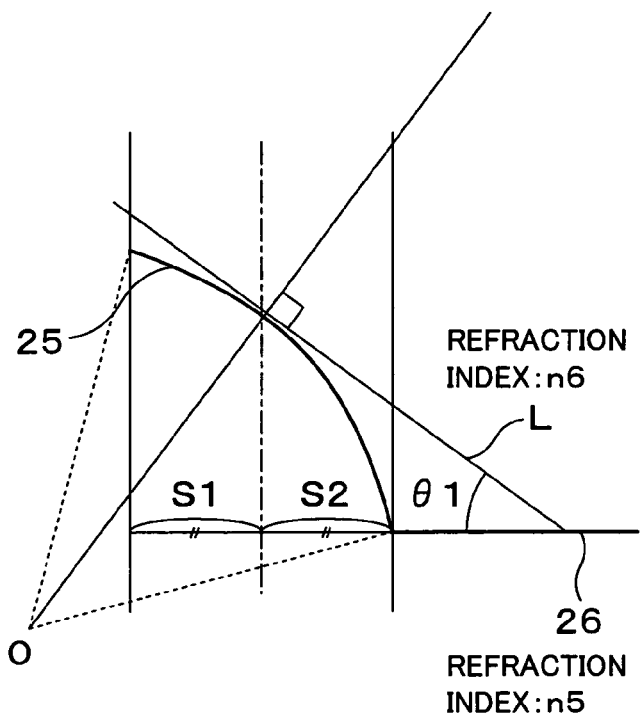

As illustrated in FIG. 4, an optical system of the projection type (rear projection type) liquid crystal display device having such a liquid crystal panel unit 2 includes, a white light source 13, an integrator 14, a mirror 16, color-separating mirrors 15, and a projection lens 18, in addition to the liquid crystal panel unit 2.

The white light source 13 is, for example, a halogen light, a high-pressure mercury-vapor lamp, a metal halide lamp, or the like. Light from the white light source 13 is evenly distributed and oriented by an integrator such as a fly-eye lens, and is then directed to the mirror 16 which directs the incident light being a substantially parallel light to the color-separating mirrors 15 where the light is divided, by color-separating mirrors 15, into R-light, G-light, and B-light. The R-light, G-light, and B-light are directed to the liquid crystal panel unit 2. At this point, the R-light is directed substantially perpendicular to the liquid crystal panel unit 2. The G-light is directed to the liquid crystal panel unit 2 at a predetermined angle θ, and the B-light is directed to the liquid crystal panel unit 2 at a predetermined angle θ, but in an opposite direction to the G-light.

The following describes the beams of the respective colors with reference to FIG. 1. The R-light is refracted and converged by the first lens 5, and is directed to the second lens 7. A focal point of the first lens 5 is designed to be positioned nearby a center of the aperture 17R of the black matrix 8. This allows the R-light incident on the second lens 7 to be converged nearby the center of the aperture 17R. Here, the R-light enters the bottom surface 7a of the second lens 7 at right angles, and is emitted from the top surface 7c.

Meanwhile, the principal ray of the B-light is directed by one of the color-separating mirrors 15 to the liquid crystal panel unit 2 at the angle θ with respect to the principal ray of the R-light. Accordingly, even after passing the first lens 5, the B-light enters the bottom surface 7a of the second lens 7 at the angle θ. The B-light is then emitted from one of the slanted surfaces 7b of the second lens 7. By passing through the second lens 7, the principal ray of the B-light is so refracted as to become substantially parallel to that of the R-light. In short, due to the functions of the first lens 5 and the second lens 7, the B-light is converged nearby a center of the aperture 17b of the black matrix 8.

The G-light and the B-light are substantially symmetrical with respect to the principal ray of the R-light. The principal ray of the G-light is directed by one of the color-separation mirrors 15 to the liquid crystal panel unit 2 at the angle θ in a direction opposite to the R-light θ with respect to the principal ray of the R-light. Accordingly, even after passing the first lens 5, the G-light also enters the bottom surface 7a of the second lens 7 at the angle θ. The G-light is then emitted from another one of slanted surfaces 7b of the second lens 7. By passing through the second lens 7, the principal ray of the G-light is so refracted as to become substantially parallel to that of the R-light. In short, due to the functions of the first lens 5 and the second lens 7, the G-light is converged nearby a center of the aperture 17G of the black matrix 8.

The R-light, G-light, and B-light, which have respectively passed through the apertures of 17R, 17G, and 17B, are respectively modulated in the picture elements R, G, and B in the pixel section 22. Then, the modulated lights are projected on a screen 19 through a projection lens 18.

In this configuration, the R-light, G-light, and B-light, which are directed to the liquid crystal panel unit 2, transmit more aperture sections 17 of the black matrix layer 8, and furthermore transmit the pixel section 22, thereby contributing to an improvement in light-using efficiency. This is because the first lens 5, in the micro-lens substrate 1 which is provided on a side of the liquid crystal panel unit 2 from which side the light enters, has a converging effect.

The G-light and B-light are directed by the color-separating mirrors 15 at the angle of θ with respect to the principal ray of the R-light. As such, if greater amount of light is converged by the first lens 5 and if nothing is done, then diameters of the respective light beams R, G, and B keep expanding, and the projection lens 18 in a subsequent section causes a vignetting. This causes a light-loss no matter how much amount of light the first lens 5 collects. In contrast, according to the configuration, the respective principal rays of the G-light and the B-light are corrected so as to be substantially parallel (preferably parallel) to the principal ray of the R-light. Thus, with the foregoing configuration, it is possible to (I) restrain the expansion of the light beam which has passed through the liquid crystal panel unit 2, and (II) prevent the light-loss caused by the vignetting due to the projection lens 18. This works synergistically with the foregoing effect, thereby making a remarkable improvement in the light-using efficiency.

Further, the effects allow a reduction of the focal length of the first lens 5. Therefore, it is possible that most of the light beam, which are not perfectly parallel, from the white light source 13 transmit the aperture sections 17 of the black matrix layer 8. This allows a further improvement in the light-using efficiency.

Furthermore, since the second lenses 7 are substantially trapezoid, it is easier to (I) increase the thickness of the lenses to increase the refraction power and (II) manufacture such lenses, as compared to lenses having spherical surfaces or cylindrical surfaces.

If the second lens 7 is mere a trapezoid, the inner-side and the outer side of the light beam (converged light beam) which is incident on a plane slanted surface, differ in their refractive angles. This causes a coma aberration and astigmatism, which consequently deteriorates the light-using efficiency. In contrast, according to the foregoing configuration, the second lens 7 is not mere a trapezoid, but each of the trapezoidal slanted surfaces 7b is a curved surface directing its convex part toward the incident light. Accordingly, it is possible to (I) restrain the difference between the refractive angles of the inner-side and the outer-side of the light beam (i.e., the respective outer-side and the inner-side of the B-light or the G-light) refracted by the slanted surfaces 7b, and (II) effectively prevent the coma aberration and astigmatism to keep a high light-using efficiency.

The following describes, with reference to FIG. 5(a) and FIG. 5(b), how the light beam travels through a plane slanted surface and a cylindrical slanted surface, respectively, in a case where the refraction index on the light incident side is higher than that on the light-outgoing side, as is the case with the second lens 7 in the micro-lens substrate 1. FIG. 5(a) illustrates the case where the slanted surface is a cylindrical surface directing its convex part toward the incident light, and FIG. 5(b) illustrates the case where the slanted surface is a plane surface. Here, the respective refraction indexes are n1<n2, and n3<n4.

As shown in FIG. 5(b), when the light beam converged by the first lens 5 is incident on a plane slanted surface 24, an incident angle of a ray L2 on an outer-side of the light beam is smaller than that of a principal ray L1, and an incident angle of a ray L3 on an inner-side of the light beam is larger than that of the L1. This causes a coma aberration and an astigmatism. On the contrary, as shown in FIG. 5(a), when the light beam which is converged by the first lens 5 is incident on a cylindrical slanted surface 25 directing its convex part toward the incident light, the incident angle of the ray L2 on the outer-side of the light beam and the incident angle of the ray L3 on the inner-side of the light beam are closer to that of the principal ray L1, as compared to the case of the plane slanted surface. Therefore, a coma aberration or an astigmatism less likely occurs.

As described, in the micro-lens substrate 1 having the two-layered structure, the second lenses 7 configuring the second micro-lens array are substantially trapezoid, and each of the slanted surfaces 7b has a curved surface directing its convex part toward the incident light. This configuration reduces the aberration, and improves the light converging characteristic, while simplifying a manufacturing of the second micro-lens array. As a result, a good light efficiency is realized.

The slanted surfaces 7b of the second lenses 7 can be designed as follows. First, as shown in FIG. 6(a), assuming that the second lens 7 is a trapezoid lens having a plane slanted surface 24, the following are set so that n5<n6 is satisfied and the principal ray of the B-light becomes substantially parallel to the principal ray of the R-light: (I) a refraction index n5 of a light-outgoing side with respect to the slanted surface 24; (II) a refraction index n6 of a light incident side with respect to the slanted surface 24; and (III) a tilt angle θ1 of the slanted surface 24 with respect to a top surface 26.

Next, as illustrated in FIG. 6(b), a cylindrical surface is set so that an angle of a tangent line L with respect to a top surface 26 is equal to the tilt angle θ1, while refraction indexes of the light-outgoing side and light-incident side of the slanted surface 25 are above set values; i.e., n5 on the light-outgoing side and n6 on the light-incident side. The tangent line L is a tangent line at a point on the cylindrical surface, which point corresponds to nearby a midpoint on a line (S1=S2 in the figure) extending from the top surface 26. At this point, a point-O in the figure denotes a center of the cylindrical surface forming the slanted surface 25.

Next described is an exemplary method for manufacturing the foregoing micro-lens substrate 1. FIGS. 7(a) to 7(g) are flow-diagrams illustrating the steps of manufacturing the micro-lens substrate 1.

First, a low-refractive resin 33 to become the planarizing layer 4 is applied between a transparent substrate 32 to become a protection plate 3 and a stumper 31. Then, the low-refractive resin 33 is cured by being exposed to UV-light irradiated in a direction indicated by the arrows in the figure (See FIG. 7(a)). Next, the stumper 31 is removed (See FIG. 7(b)), and then a transparent substrate 35 to become the intermediate substrate 6 is bonded via a high-refractive resin 34 as an adhesive layer (See FIG. 7(c)).

Then, a high-refractive resin 36 to become the second lens 7, and a negative resist 37 are applied in this order to the transparent substrate 35 (See FIG. 7(d)). Then, a process of exposing and developing is carried out by using a later-described grayscale mask (not shown) (see FIG. 7(e)). Then, a shape of the lens is transferred to the high-refractive resin 36 by carrying out a dry-etching (see FIG. 7(f)). Then, after carrying out a planarization with respect to the high-refractive resin 36 by using a low-refractive resin 38 to become a planarizing layer 20 (See FIG. 7(g)), the micro-lens substrate 1 is obtained.

Note that, after the steps, a passivation layer and the black matrix layer 8, are formed on the side of the planarizing layer 20 in the micro-lens substrate 1 (not shown). Then, the bottom substrate 12 having the electrode layer 11 is further pasted, and liquid crystal to become the liquid crystal layer 10 is filled in a gap between the bottom substrate 12 and the micro-lens substrate 1 (not shown). Thus, the liquid crystal panel unit 2 is prepared.

The micro-lens substrate 1 thus prepared has the second lenses 7 whose slanted surfaces are cylindrical surfaces directing their convex parts toward the incident light as shown in FIG. 3. This allows less coma aberrations and less astigmatisms than the configuration in which the slanted surfaces are the plane surfaces. Thus, the light-using efficiency is improved.

Figure 8:
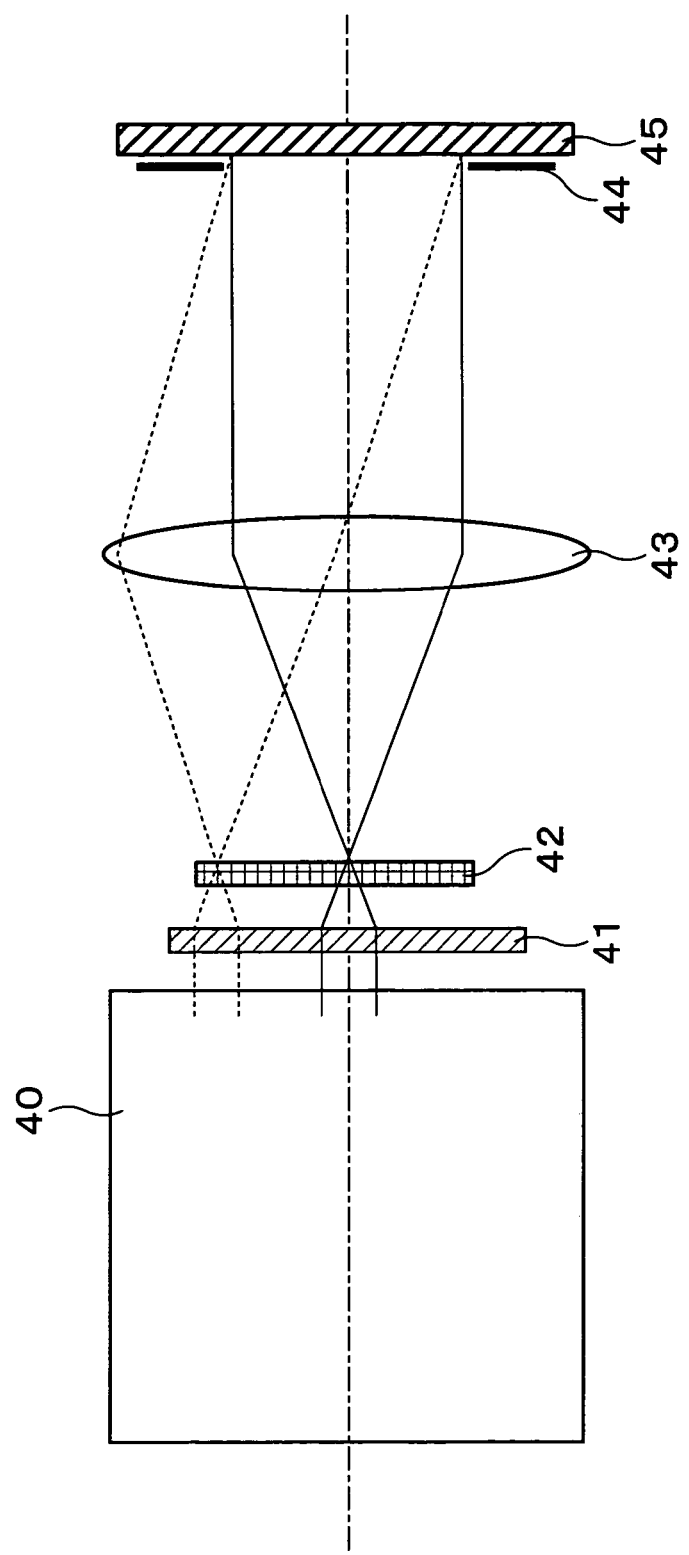
FIG. 8 is a schematic view illustrating a configuration of an exposing device in which a grayscale mask is used, the exposing device being used in a process of manufacturing the micro-lens substrate.

The following describes an exposure method used for forming the second lenses 7, the exposure method using the grayscale mask. FIG. 8 illustrates a schematic configuration of an exposing apparatus for use in manufacturing the second lenses 7. The exposing apparatus includes: a parallel light source 40 for emitting a parallel beam; fly-eye lens 41; a grayscale mask 42; a collimator lens 43; and an aperture 44. The reference numeral 45 indicates a micro-lens substrate which is in process of being manufactured. In this micro-lens substrate, first lenses 5 are already formed, and the high-refractive resin 36 and the negative resist 37 have been applied in this order to the transparent substrate 35 to become the intermediate substrate 6 (See FIG. 7(d)).

The grayscale mask 42 is a photomask on which transmittances of a wavelength of light (i.e., an i-ray in the present embodiment) for use in the exposure is distributed in accordance with the shapes of the second lenses 7. With this exposing apparatus, light quantities are distributed on the negative resist 37, and the negative resist 37 whose film thickness is varied according to the distributed light quantities is obtained (See FIG. 7(e)). Then, the second lenses 7 are formed by carrying out an etching for transferring the pattern to the high-refractive resin 36, and the low-refractive resin 38 is applied for planarizing the layer (FIG. 7(g)).

Here, in the formation of the micro-lens substrate 1, the refraction indexes of the high-refractive resin and the low-refractive resin are 1.59 and 1.41, respectively at a wavelength of 588 nm. However, a similar effect can be obtained with different values of the respective refractive indexes, provided that there is a difference between these refraction indexes. Further, in the case of using a negative resist as in the present embodiment, the transmissivity of the light is set so that a light quantity is large in a position where the lens needs to be thicker, and that a light quantity is small in a position where the lens needs to be thinner.

Further, the foregoing method for manufacturing the micro-lens substrate 1 simplifies a complicated process of positioning of the first and the second lenses 5 and 7. Since the positions of the second lenses 7 are determined based on the positions of the first lenses 5, two layers of the micro-lens arrays are accurately positioned. As a result, it is also possible to easily provide a high quality projection-type liquid crystal display device with high light-using efficiency and without uneven brightness and/or mixing of colors.

Note that in the present embodiment, the second lens 7 is a substantially trapezoidal lens whose bottom surface 7a is provided so that the light is incident on the bottom surface 7a. However, the second lens 7 is not limited to this as long as each of the slanted surfaces of the second lens 7 is provided so that the light is incident on the slanted surface directing its convex part toward the incident light. Alternatively, it is possible to use a substantially trapezoidal lens, whose bottom surface is provided so that the light goes out of the bottom surface. Such a trapezoidal lens is described in detail in Embodiment 2.

Further, in the present embodiment, the aspherical lens is used as the first lens in order to improve the converging characteristic. However, the same effect can be obtained when using a spherical lens.

Embodiment 2

The following describes another embodiment of the present invention, with reference to FIGS. 9 to 13. Note that a configuration of the present invention is the same as that of the embodiment 1 unless otherwise described in this embodiment. Accordingly, the same symbols are given to the members that have the same functions as those shown in figures of the foregoing embodiment 1, and the descriptions of those members are omitted here for convenience of explanation.

A projection-type liquid crystal display device of the present embodiment has the same configuration as that of the projection-type liquid crystal display device in the embodiment 1, except in that a liquid crystal panel unit 52 is provided instead of the liquid crystal panel unit (liquid crystal display element) 2.

Figure 9:
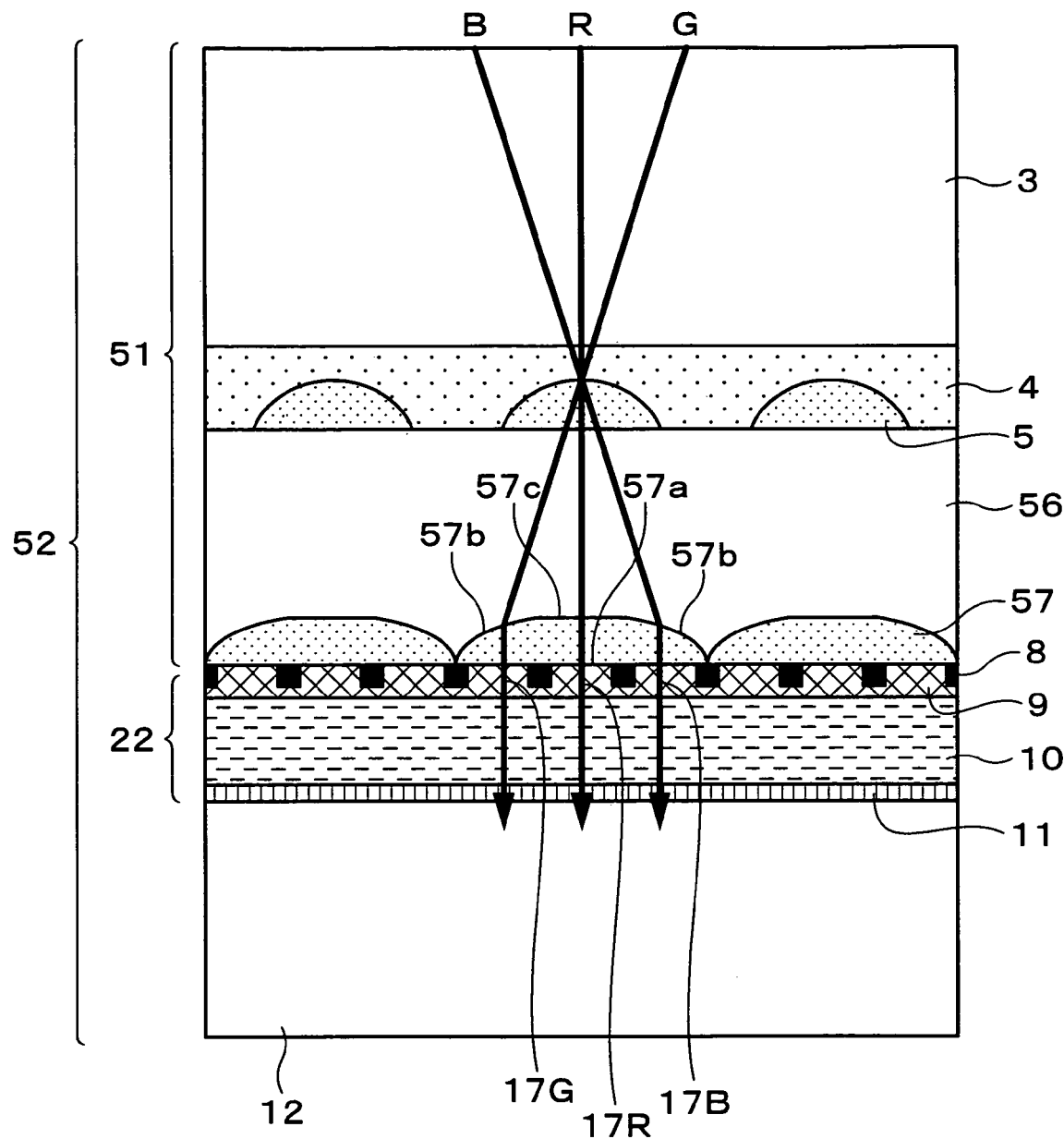
FIG. 9 illustrates another embodiment of the present invention, and is a cross sectional view illustrating a liquid crystal panel unit provided in a projection-type liquid crystal display device.

As shown in FIG. 9, in the present embodiment, the liquid crystal panel unit 52 of the projection-type liquid crystal display device includes a micro-lens substrate 51. A light-transmissive bottom substrate 12 is provided under the micro-lens substrate 51. The light-transmissive bottom substrate 12 is arranged so that a transparent electrode 9 made of an ITO or the like, a liquid crystal layer 10, and an electrode layer 11 including a TFT or the like are formed under the micro-lens substrate 51 in this order. As is clear from this, the liquid crystal panel unit 2 and the liquid crystal panel unit 52 are different from each other in configurations of the respective micro-lens substrates.

The micro-lens substrate 51 is arranged so that a plurality of first lenses (first micro lenses) 5 made of a high-refractive resin are provided under a light-transmissive protection plate 3 via a planarizing layer 4 made of a low-refractive resin. Each of the first lenses 5 configuring the first micro-lens array is an aspherical lens having convex surface directing toward the incident light. The configuration of the micro-lens substrate 51 thus explained is the same as that of the micro-lens substrate 1.

A difference between the micro-lens substrate 51 and the micro-lens substrate 1 resides in second lenses (second micro-lenses) 57 configuring a second micro-lens array. More specifically, the difference between the micro-lens substrate 51 and the micro-lens substrate 1 resides in their methods for manufacturing the second lenses 57. That is, in the micro-lens substrate 1, the high-refractive resin 36 is formed under the light-transmissive intermediate substrate 6 which is attached to the bottom surface of the first micro-lens array, and the second lenses 7 are formed by processing the high-refractive resin 36. In contrast, in the micro-lens substrate 51, second lenses 57 are formed (i) by processing a bottom surface, so that the bottom surface has a lens shape, of the light-transmissive intermediate substrate 56, which is attached to the bottom surface of the first micro-lens array, and (ii) by filling a high-refractive resin in the bottom surface thus processed. Further, a black matrix layer 8 is formed under the second micro-lens array.

Figure 10:
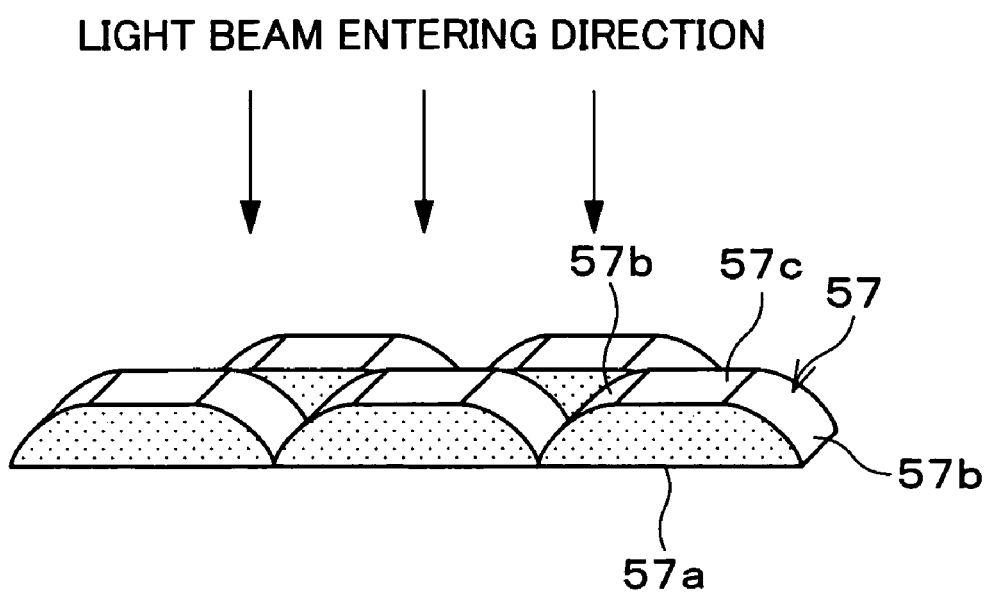
FIG. 10 is a perspective view illustrating second lenses constituting a second micro-lens array in a micro-lens substrate provided in the liquid crystal panel unit.
Figure 11:
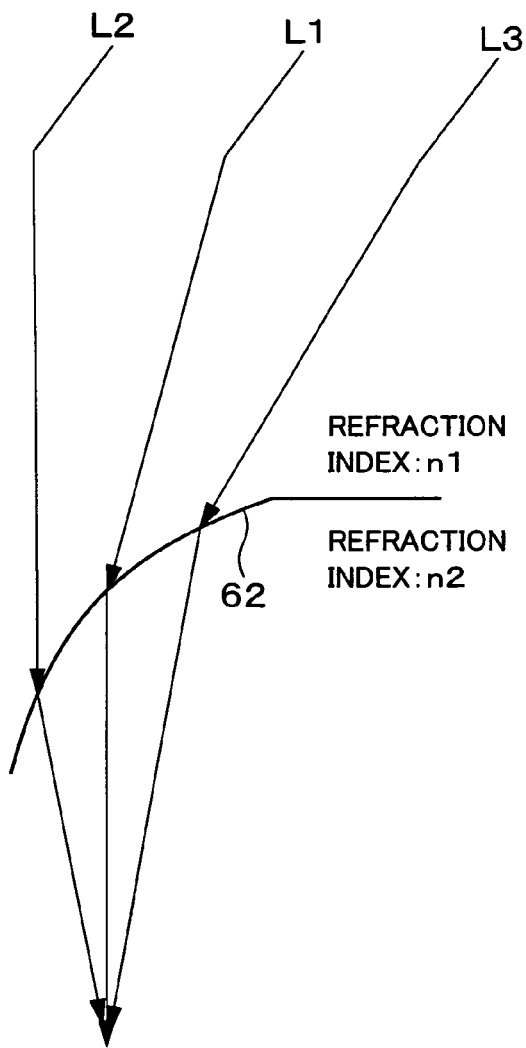
FIG. 11(a) is an explanatory diagram illustrating h how a light beam travels through a curved slanted surfaces of the second lens constituting the second micro-lens array.
FIG. 11(b) is an explanatory diagram illustrating how a light beam travels through a plane slanted surfaces of the second lens constituting the second micro-lens array.
Figure 11:
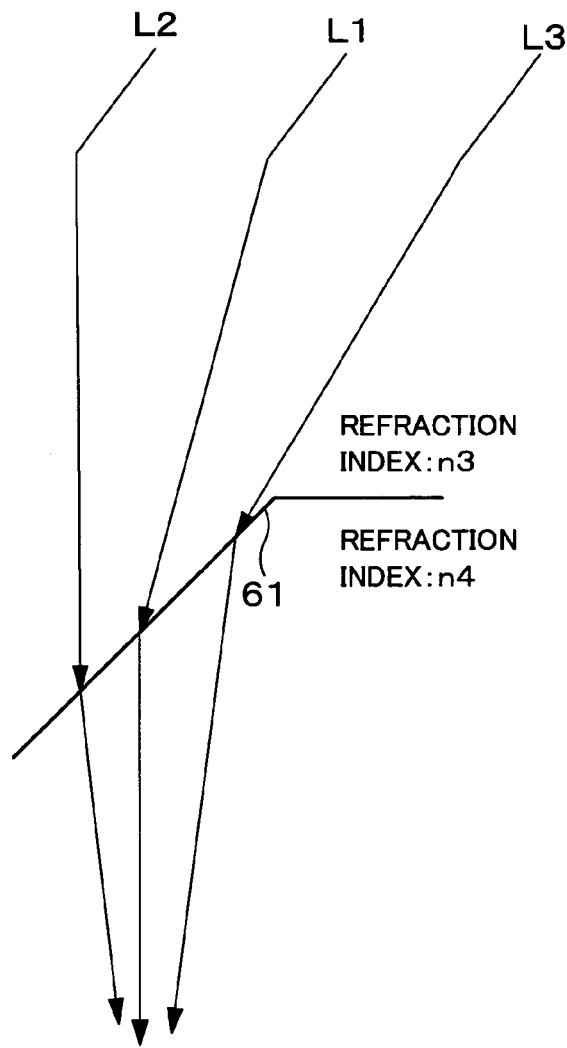
Figure 12:
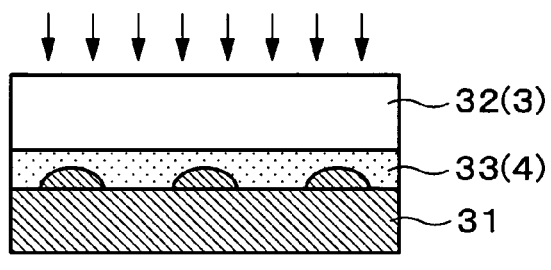
FIGS. 12(a) to 12(g) are cross sectional views illustrating a method for manufacturing the micro-lens substrate provided in the liquid crystal panel unit.
Figure 12:
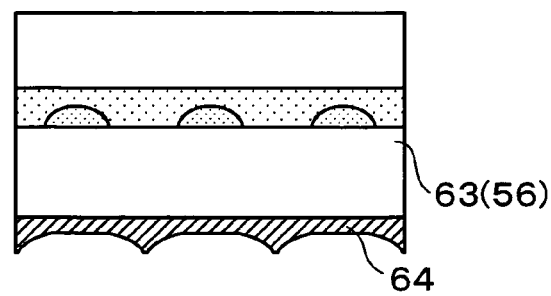
Figure 12:
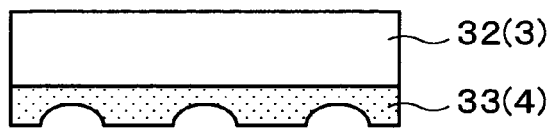
Figure 12:
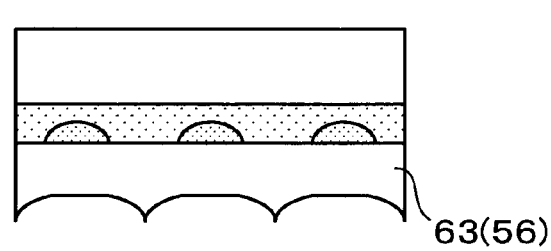
Figure 12:
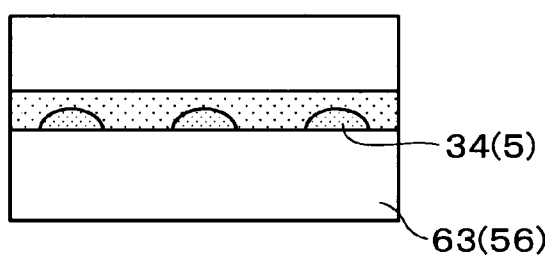
Figure 12:
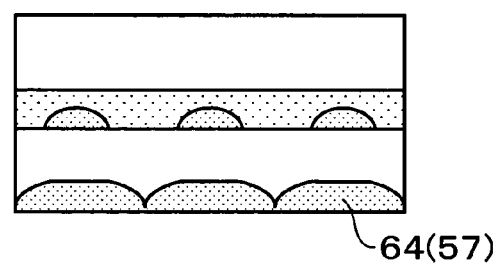
Figure 12:
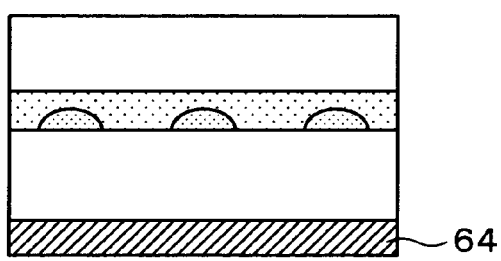

As shown in FIG. 10, the second lenses 57 are substantially trapezoid. Each of the second lenses 57 has (I) a bottom surface 57a from which the light goes out and (II) curved slanted surfaces 57b directing their convex part toward the incident light as is the case with the second lenses 7. Accordingly, the second lenses 7 are substantially trapezoidal lenses in which the slanted surfaces 7b are curved in a concave manner, whereas the second lenses 57 are the substantially trapezoidal lenses in which slanted surfaces 57b are curved in a convex manner. For example, the second lens 57 has the following dimension. The bottom surface 57a of the second lens 57 is Length 15 μm×Width 45 μm. The top surface 57c of the second lens 57 is Length 15 μm×Width 15 μm. And the height of the second lens 57 is 20 μm. Further, the slanted surfaces 57b of the second lens 7 are cylindrical.

An alignment of the second lenses 57 configuring the second micro-lens array is the same as that of the second lenses 7 as shown in FIG. 2(b). A positional relationship between the second lenses 57 and the first lenses 5, and a positional relationship between the second lenses 57 and picture elements of R, G, and B in the pixel section 22 are also the same as those of the second lenses 7 illustrated in FIG. 2(c) and FIG. 2(d).

In the projection-type liquid crystal display device (rear projection type) including such a liquid crystal panel unit 52, an R-light out of R-, G-, and B-lights which have been separated by a color-separating mirrors 15, is refracted by the first lens 5, and is converged and directed to the second lens 57. A focal point of the first lens 5 is designed to be positioned nearby a center of the aperture 17R of the black matrix 8. As such, the R-light incident on the second lens 57 is converged nearby the center of the aperture 17R. Here, the R-light enters the second lens 57 perpendicularly to the top surface 57c, and goes out of the bottom surface 57a.

Meanwhile, the principal ray of the B-light is directed by one of the color-separating mirrors 15 to the liquid crystal panel unit 52 at the angle θ with respect to the principal ray of the R-light. Accordingly, even after passing the first lens 5, the B-light enters one of the slanted surfaces 57b of the second lens 57 at the angle θ. The B-light is then emitted from the bottom surface 57a of the second lens 57. By passing through the second lens 57, the principal ray of the B-light is so refracted as to become substantially parallel to that of the R-light. In short, due to the functions of the first lens 5 and the second lens 57, the B-light is converged nearby a center of the aperture 17B of the black matrix 8.

The G-light and the B-light are substantially symmetrical with respect to the principal ray of the R-light. The principal ray of the G-light is directed by one of the color-separation mirrors 15 to the liquid crystal panel unit 52 at the angle θ in a direction opposite to the R-light θ with respect to the principal ray of the R-light. Accordingly, even after passing the first lens 5, the G-light also enters the another one of slanted surfaces 57b of the second lens 57 at the angle θ. The B-light is then emitted from the bottom surface 57a of the second lens 57. By passing through the second lens 57, the principal ray of the G-light is so refracted as to become substantially parallel to that of the R-light. In short, due to the functions of the first lens 5 and the second lens 57, the G-light is converged nearby a center of the aperture 17G of the black matrix 8.

Further, as in the micro-lens substrate 1 of Embodiment 1, in the micro-lens substrate 51, since the second lenses 57 are substantially trapezoid, it is easier to (I) increase the thickness of the lenses to increase the refraction power and (II) manufacture such lenses, as compared to lenses having spherical surfaces or cylindrical surfaces. Further, according to the foregoing configuration, the second lens 57 is not mere a trapezoid, but each of the trapezoidal slanted surfaces 57B is a curved surface directing its convex part toward the incident light. Accordingly, it is possible to (I) restrain the difference between the refractive angles of the inner-side and the outer-side of the light beam (i.e., the respective outer-side and the inner-side of the B-light or the G-light) refracted by the slanted surfaces 57b, and (II) effectively prevent the coma aberration and astigmatism to keep a high light-using efficiency.

The following describes, with reference to FIG. 11(a) and FIG. 11(b), how the light beam travels through a plane slanted surface and a cylindrical slanted surface, respectively, in a case where the refraction index on the light incident side is higher than that on the light-outgoing side, as is the case with the second lens 57 in the micro-lens substrate 51. FIG. 11(a) illustrates the case where the slanted surface is a cylindrical surface directing its convex part toward the incident light, and FIG. 11(b) illustrates the case where the slanted surface is a plane surface. Here, the respective refraction indexes are n1<n2, and n3<n4.

As shown in FIG. 11(b), when the light beam converged by the first lens 5 is incident on a plane slanted surface 61, an incident angle of a ray L2 on an outer-side of the light beam is smaller than that of a principal ray L1, and an incident angle of a ray L3 on an inner-side of the light beam is larger than that of the L1. This causes a coma aberration and an astigmatism. On the contrary, as shown in FIG. 11(a), when the light beam which is converged by the first lens 5 is incident on a cylindrical slanted surface 62 directing its convex part toward the incident light, the incident angle of the ray L2 on the outer-side of the light beam and the incident angle of the ray L3 on the inner-side of the light beam are closer to that of the principal ray L1, as compared to the case of the plane slanted surface. Therefore, a coma aberration or an astigmatism less likely occurs.

As described, in the micro-lens substrate 51 having the two-layered structure, the second lenses 57 configuring the second micro-lens array are substantially trapezoid, and each of the slanted surfaces 57b has a curved surface directing its convex part toward the incident light. This configuration reduces the aberration, and improves the light converging characteristic, while simplifying a manufacturing of the second micro-lens array. As a result, a good light efficiency is realized.

The slanted surfaces 57b of the second lens 57 can be designed as in the case of the slanted surfaces 7b of the second lenses 7.

Next described is an exemplary method for manufacturing the foregoing micro-lens substrate 51. FIGS. 12(a) to 12(g) are flow-diagrams illustrating the steps of manufacturing the micro-lens substrate 1.

First, a low-refractive resin 33 to become the planarizing layer 4 is applied between a transparent substrate 32 to become a protection plate 3 and a stumper 31. Then, the low-refractive resin 33 is cured by being exposed to UV-light irradiated in a direction indicated by the arrows in the figure (See FIG. 12(a)). Next, the stumper 31 is removed (See FIG. 12(b)), and then a transparent substrate 63 to become the intermediate substrate 56 is bonded via a high-refractive resin 34 as an adhesive layer, the high-refractive resin 34 to become the first lens 5 (See FIG. 12(c)).

Then, a negative resist 64 is applied to the transparent substrate 63 (See FIG. 12(d)). Then, aforementioned process of exposing and developing is carried out by using aforementioned grayscale mask (not shown)(see FIG. 12(e)). Then, a shape of the lens is transferred to the transparent substrate 63 by carrying out a dry-etching (see FIG. 12(f)). Then, after filling in the high-refractive resin 64 to become the second lens 57 (See FIG. 12(g)), the micro-lens substrate 51 is obtained.

Note that, after the steps, a passivation layer and the black matrix layer 8, are formed on the side of bottom surface 57a of the second lens in the micro-lens substrate 51 (not shown). Then, the bottom substrate 12 having the electrode layer 11 is further pasted, and liquid crystal to become the liquid crystal layer 10 is filled in a gap between the bottom substrate 12 and the micro-lens substrate 51 (not shown). Thus, the liquid crystal panel unit 52 is prepared.

The micro-lens substrate 51 thus prepared has the second lenses 57 whose slanted surfaces are cylindrical surfaces directing their convex parts toward the incident light as shown in FIG. 10. This allows less coma aberrations and less astigmatisms than the configuration in which the slanted surfaces are the plane surfaces. Thus, the light-using efficiency is improved.

Here, in the formation of the micro-lens substrate 51, the refraction indexes of the high-refractive resin and the low-refractive resin are 1.59 and 1.41, respectively at a wavelength of 588 nm. However, a similar effect can be obtained with different values of the respective refractive indexes, provided that there is a difference between these refraction indexes. Further, in the case of using a negative resist as in the present embodiment, the transmissivity of the light is set so that a light quantity is large in a position where the lens needs to be thicker, and that a light quantity is small in a position where the lens needs to be thinner.

Further, as in Embodiment 1, the foregoing method for manufacturing the micro-lens substrate 51 simplifies a complicated process of positioning of the first and the second lenses 5 and 57. Since the positions of the second lenses 57 are determined based on the positions of the first lenses 5, two layers of the micro-lens arrays are accurately positioned. As a result, it is also possible to easily provide a high quality projection-type liquid crystal display device with high light-using efficiency and without uneven brightness and/or mixing of colors.

Figure 13:
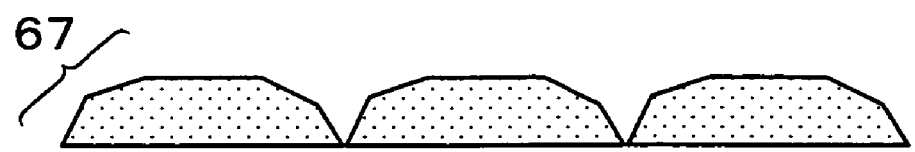
FIG. 13 is a cross sectional view illustrating a second micro-lens array having the second lenses whose slanted surfaces have a plurality of surfaces so as to form a polyhedral configuration.

Note that in Embodiments 1 and 2, the second lenses 7 and 57 are substantially trapezoidal lenses having the cylindrical slanted surfaces 7b and the cylindrical slanted surfaces 57b directing their convex parts toward the light incident side respectively. However, the respective slanted surfaces 7b and 57b are not limited to the specific ones as long as the slanted surfaces 7b and 57b direct their convex parts toward the light source. For example, the slanted surfaces 7b and 57b may be spherical, aspherical, or a polyhedral as shown in FIG. 13 having multiple-step plane surfaces. Note that FIG. 13 illustrates a shape of the lenses in cases of a low refraction index on the light incident side, as is the case with the second lenses 57 in the micro-lens substrate 51 of the embodiment 2.

With a polyhedral slanted surfaces 67, it is possible to make the manufacturing process easier than a spherical, an aspherical, or a cylindrical surface. This allows a better manufacturing yield. Further, in a case of a configuration, in which the shape of lens approaches a cylindrical surface as the number of steps increases. It is needless to say that this restrains the coma aberration and the astigmatism more effectively.

Further, in the second lenses 7 and 57, the top surfaces 7c and 57c, on which the R-beam is incident and which corresponds to center portions are flat plane surfaces. However, the top surfaces 7c and 57c are not limited to the flat plane surfaces, provided that a light beam is incident, perpendicularly with respect to principal rays, on the top surfaces 7c and 57c. For example, the top surfaces 7c and 57c may be spherical, cylindrical, or aspherical surfaces. Note, however, that thicknesses of the second lenses 7 and 57 are preferably thinner in terms of simplicity of the manufacturing process. Accordingly, it is preferable that the top surfaces 7c and 57c be plane surfaces.

Further, in the present embodiment, an aspherical lens is used as the first lens so as to improve the converging characteristic. However, it should be noted that the effects of the present invention are not affected, even if a spherical lens is used.

Further, the projection-type liquid crystal display device of the present invention may be expressed as follows. Namely, a projection-type liquid crystal display device of the present invention is a projection-type color liquid crystal display device including: A) a white beam source; B) a light beam dividing section for dividing a white beam emitted from the white beam source into a plurality of light beams whose respective wavelength bands are different from one another; C) a liquid crystal display element being irradiated with the plurality of the light beams obtained from the light beam dividing section; D) two-layers of micro-lens arrays, provided on a light-source side of the liquid crystal display element, including a) a first micro-lens array for converging the plurality of the light beams on apertures of respective picture elements of the liquid crystal element, the apertures corresponding to the respective wavelength bands of the light beams, and b) a second micro-lens array for collimating principal rays of the respective light beams; and E) a projecting section for projecting the plurality of the light beams being modulated by the liquid crystal display element, the second micro-lens array having three surfaces of a central portion and side portions, the central portion being center portion perpendicular to a principal ray of the light beam incident on the center portion, the side portions each having a curved surface which is slanted at a predetermined angle with respect to a principal ray of an incident light beam.

Further, the configuration may be so adapted that the curved side-portions have (A) aspherical surfaces on which the light beams are incident, (B) spherical surfaces on which the light beams are incident; or (C) cylindrical surfaces on which the light beams are incident.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to a color-filterless projection-type liquid crystal display device of a single-panel mode, the projection-type liquid crystal display device, in which two layers of micro-lens arrays are provided on a light incident side of a liquid crystal display element thereof.

The invention claimed is:

1. A micro-lens substrate provided on a light-incident side of a liquid crystal display element for use in a projection-type liquid crystal display device, the micro-lens substrate including: (a) a first micro-lens array having a first micro lens for converging a plurality of light beams whose incident angles are different from one another on picture elements of the liquid crystal element respectively corresponding to the light beams; and (b) a second micro-lens array having a second micro lens for collimating principal rays of the respective light beams converged, by the first micro lens, on the respectively corresponding picture elements, wherein:

the second micro-lens is substantially trapezoid so that:
the second micro-lens includes (I) a center portion perpendicular to a principal ray of the light beam incident on the center portion and (II) side portions each having a convex slanted surface which is slanted at a predetermined angle with respect to a principal ray of an incident light beam and directs its convex part towards the light incident side, the incident light beam being incident on each of the side portions.

2. The micro-lens substrate as set forth in claim 1, wherein the convex slanted surface is spherical surface.

3. The micro-lens substrate as set forth in claim 1, wherein the convex slanted surface is cylindrical.

4. The micro-lens substrate as set forth in claim 1, wherein the convex slanted surface is aspherical.

5. The micro-lens substrate as set forth in claim 1, wherein the convex slanted surface is in a polyhedral shape having a plurality of surfaces.

6. A liquid crystal display element for use in a projection-type liquid crystal display device, comprising the micro-lens substrate as set forth in claim 1.

7. A projection-type liquid crystal display device comprising the liquid crystal display element as set forth in claim 6.

8. A projection-type liquid crystal display device comprising:
A) a white beam source;
B) a light beam dividing section for dividing a white beam emitted from the white beam source into a plurality of light beams whose respective wavelength bands are different from one another;
C) a liquid crystal display element to which the plurality of the light beams obtained from the light beam dividing section are incident, the light beams whose respective incident angles are different from one another;

D) two-layers of micro-lens arrays, provided on a light-source side of the liquid crystal display element, including a) a first micro-lens array having a first micro lens for converging a plurality of light beams whose incident angles are different from one another on picture elements of the liquid crystal element respectively corresponding to the light beams, and b) a second micro-lens array a second micro lens for collimating principal rays of the respective light beams converged, by the first micro lens, on the respectively corresponding picture elements; and E) a projecting section for projecting the plurality of the light beams being modulated by the liquid crystal display element, wherein:

the second micro-lens is substantially trapezoid so that:

the second micro-lens includes (I) a center portion perpendicular to a principal ray of the light beam incident on the center portion and (II) side portions each having a convex slanted surface which is slanted at a predetermined angle with respect to a principal ray of an incident light beam and directs its convex part towards the light incident side, the incident light beam being incident on each of the side portions.

* * * * *